A. E. CHERNACK.
LET-OFF FOR LOOMS.
APPLICATION FILED MAY 2, 1913.
1,105,588.
Patented July 28, 1914.
2 SHEETS—SHEET 1.
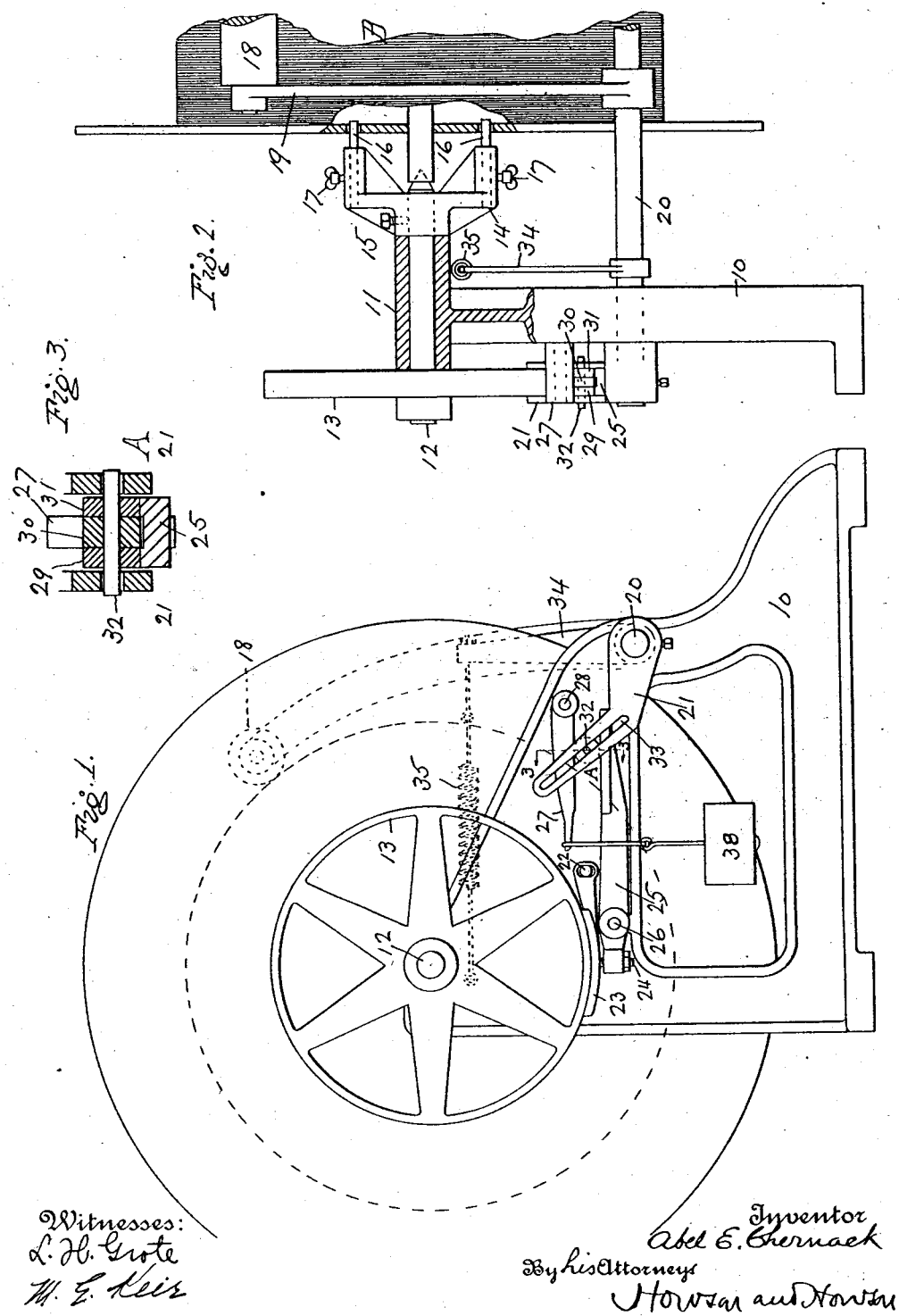

A. E. CHERNACK.
LET-OFF FOR LOOMS.
APPLICATION FILED MAY 2, 1913.
1,105,588.
Patented July 28, 1914.
2 SHEETS—SHEET 2.
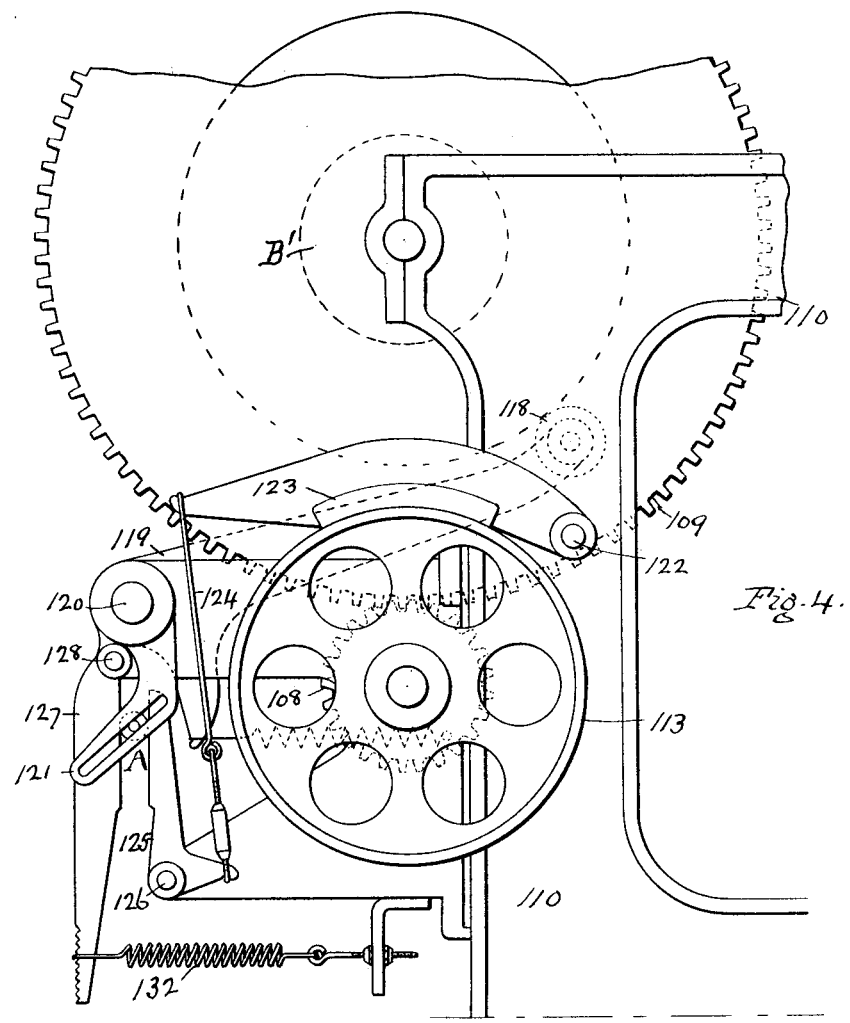
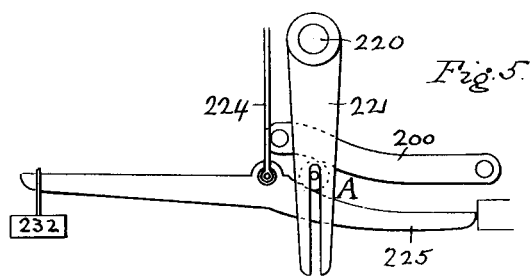

UNITED STATES PATENT OFFICE.

ABEL E. CHERNACK, OF PROVIDENCE, RHODE ISLAND.

LET-OFF FOR LOOMS.

1,105,588. Specification of Letters Patent. Patented July 28, 1914.

Application filed May 2, 1913. Serial No. 765,138.

*To all whom it may concern:*

Be it known that I, ABEL E. CHERNACK, a subject of the Emperor of Russia, and a resident of the city of Providence, county of Providence, and State of Rhode Island, have invented a certain new and useful Improved Let-Off for Looms, of which the following is a specification.

My invention relates to the construction of frictional let-offs for the warp beams of looms, and the main object of my invention is to construct a simple, strong and efficient let-off which will provide a uniform effect upon the warps, as they are let off.

In the accompanying drawings, Figure 1 is a side elevation of a construction of let-off embodying my invention, Fig. 2 is an end elevation, partly in section; Fig. 3 is an enlarged sectional view on the line 3—3, Fig. 1; Fig. 4 is a side elevation of a modification; Fig. 5 is a diagram illustrating a modification.

Referring to Figs. 1, 2 and 3, a part of the frame of the machine is shown at 10, and is provided with bearings 11 for a shaft 12 carrying a brake wheel 13. On the inner side of the frame 10, a bracket 14 may be secured to the inner end of the shaft 12 by a set screw 15. This bracket 14 carries pins 16, which are adapted to engage openings in the flange of the warp beam B and are laterally adjustable in the bracket (Fig. 2), to be secured in adjusted positions by set screws 17. To bear against the warps on the beam B is a feeler roller 18 carried by arms 19 on a shaft 20, which is also mounted in bearings in the frame 10. This shaft 20 has secured to its outer end an arm 21, for varying the leverage of the following system of levers which act upon the friction device in the form of a brake shoe 23 (Fig. 1) for the brake wheel 13. This brake shoe is pivoted loosely at 22 to the frame and is acted upon by the adjustable bearing pin 24 in the end of the brake lever 25, which is pivoted to the frame at 26. Above this brake lever 25 is another lever 27, pivoted at 28 to the frame and between these two levers 25 and 27 is an adjustable bearing piece A which preferably consists of three antifriction rollers, 29, 30 and 31 mounted side by side upon a common axle 32, Fig. 3. The bearing faces of the two levers 25, 27 are so constructed that one roller, say 30, bears against the lever 27, while the rollers 29 and 31 bear against the lever 25 and thus diminish the friction. The lever 27 is what I may call the power lever being acted upon by the power in the form of a weight or spring. In Fig. 1, I have shown it as acted upon by a weight 38. The position of the adjustable bearing piece A between the levers 25 and 27 with relation to their respective pivoting points is controlled by the arm 21, which is forked as seen in Fig. 2 to embrace the levers 25 and 27 and also has slots 33 in which are guided the opposite ends of the axle pin 32, Fig. 3.

The operation of the described construction is that the feeler roller 18 is constantly pressed against the warps on the beam by the action of the spring 35, and as the diameter of the wound warp roll diminishes, the arm 21 will automatically press the bearing piece A in a substantially horizontal direction from the pivot 28 of lever 27 toward the pivot 26 of the lever 25, and by the consequent change of leverage, cause a diminution in the pressure of the brake 23 against the wheel 13. In order that the braking effect may produce a uniform tension notwithstanding the diminution in the diameter of the warp roll, the controlling portion of the arm 21, in other words, the slot 33, Fig. 1, is arranged at such an inclination to the path of movement of the bearing piece A that the relative adjustment of the latter will change progressively as the diameter of the warp roll diminishes, that is to say, the leverage of the brake lever will diminish at an accelerated speed with relation to the diminution of the warp roll diameter. Thus as seen in Fig. 1, the slots 33 in the arm 21 are not substantially perpendicular but at an inclination to the path of movement of the bearing piece A, and therefore as the arm 21 moves downwardly on the diminution of the diameter of the warp roll, the axis of the piece will move farther outward from the center 20 of the arm 21 and consequently the degree of adjustment of this bearing piece A will be gradually less in relation to the diminution of the diameter of the warp roll. In this way I find I can get a truer relation of the changing leverage and braking effect to the decreasing diameter of the roll.

In the modification shown in Fig. 4, the warp beam B' has a gear connection with the brake wheel 113, the gear wheels being indicated at 109 and 108. The brake shoe 123, pivoted at 122, is connected through an adjustable connecting rod 124 with the short arm of a bell crank lever 125 pivoted at 126 to a fixed bracket on the frame 110. At 128, another lever 127 is pivoted to the frame and has its free arm acted upon by a pull spring 132. Between the two levers is an adjustable bearing piece A, similar to that described in connection with Figs. 1 to 3, and guided by the slotted arms of a forked lever 121, secured to a shaft 120, which is mounted in bearings in the frame of the machine. This shaft 120 has arms 119 which carry a feeler roll 118 to bear against the warp roll, as already described. The operation of this form of apparatus is substantially the same as that of Figs. 1, 2 and 3.

In the construction illustrated in Fig. 5, I have a modified form of lever. The part 220 is a shaft corresponding with the shaft 20 of Figs. 1 and 2 or the shaft 120 of Fig. 4, and carrying arms with a feeler roll such as 18 or 118. The lower end of the arm 221 on this shaft is slotted to guide the spindle of the adjustable bearing piece A and is also forked to embrace a fixed bearing bar 200 and the right hand end of the lever 225. The bearing piece A lies between the underside of the fixed bar 200 and the upper side of the lever 225 and constitutes a fulcrum for the right hand end of this lever. At the opposite end is applied the power in the form of a spring or a weight 232, which tends to draw down the intermediate connecting rod or strap 224 to the brake to apply the latter to the wheel,—not shown. The turning of the shaft 220, as the diameter of the warp roll diminishes, will move the lower end of the lever 221 to the right to change the leverage and the braking effect accordingly. In this case the underside of the fixed bar 200 and the upper side of the right hand end of the lever constituting the path of adjustment of the bearing piece A are inclined in relation to the guide slots in the lever 221, preferably in the curved form shown to vary the change of leverage in relation to the diminution of the diameter of the warp roll, as described with reference to Figs. 1 and 2.

I claim as my invention:

1. A let-off motion for warp beams, comprising a brake wheel to rotate with the beam, a friction device therefor, a brake lever to act upon the friction device, a power means to act upon the brake lever, and means for automatically diminishing the leverage of said brake beam at an accelerated speed with relation to the diminution of the warp roll.

2. A let-off motion for warp beams, comprising a brake wheel to rotate with the beam, a friction device therefor, a brake lever to act upon the friction device, a power means to act upon the brake lever, a movable bearing piece for the lever, and an arm controlling the position of the bearing piece, the controlling portion of said arm being so inclined to the path of adjustment of the bearing piece as to diminish the leverage of the brake lever at an accelerated speed with relation to the diminution of the diameter of the warp roll.

3. A let-off motion for warp beams, comprising a brake wheel to rotate with the beam, a friction device therefor, a brake lever to act upon the friction device, a power lever, a movable bearing piece between the brake lever and power lever, and an arm to move the bearing piece to change the leverage of both said levers as the diameter of the warp roll diminishes.

4. A let-off motion for warp beams, comprising a brake wheel to rotate with the beam, a friction device therefor, a brake lever to act upon the friction device, a power lever, a movable bearing piece between the brake lever and power lever, and an arm to move the bearing piece to change the leverage of both said levers as the diameter of the warp roll diminishes, the controlling portion of said arm being inclined to the path of adjustment of the bearing piece, whereby the change of leverage is progressive with relation to the diminution of the diameter of the warp roll.

In testimony whereof I have signed my name to this specification, in the presence of two subscribing witnesses.

ABEL E. CHERNACK.

Witnesses:
ALLAN E. GRANT,
JOSEPH P. MCNABB.

Copies of this patent may be obtained for five cents each, by addressing the "Commissioner of Patents, Washington, D. C."